United States Patent
Kuang et al.

(10) Patent No.: US 7,986,849 B2
(45) Date of Patent: Jul. 26, 2011

(54) SYSTEM AND METHOD FOR ACCURATE PARALLEL QUANTIZATION WITH TWO MULTIPLICATION OPERATIONS

(75) Inventors: Xian-Feng Kuang, Beijing (CN); Bo Liu, Beijing (CN)

(73) Assignee: Oracle America, Inc., Redwood City, CA (US)

( * ) Notice: Subject to any disclaimer, the term of this patent is extended or adjusted under 35 U.S.C. 154(b) by 927 days.

(21) Appl. No.: 11/736,235

(22) Filed: Apr. 17, 2007

(65) Prior Publication Data

US 2008/0260277 A1 Oct. 23, 2008

(51) Int. Cl.
*G06K 9/00* (2006.01)

(52) U.S. Cl. ........ 382/251; 382/250; 382/174; 382/199; 382/248; 708/650; 708/402; 708/400; 348/405; 348/423; 348/395

(58) Field of Classification Search .................. 382/251, 382/250, 248, 174, 199; 708/605, 402, 400; 348/405, 423, 395
See application file for complete search history.

(56) References Cited

U.S. PATENT DOCUMENTS

| | | | | |
|---|---|---|---|---|
| 5,410,352 A | * | 4/1995 | Watanabe | 375/240.03 |
| 5,982,935 A | * | 11/1999 | Arbel | 382/233 |
| 6,351,570 B1 | * | 2/2002 | Kobayashi | 382/250 |
| 7,065,546 B2 | * | 6/2006 | Auyeung et al. | 708/650 |
| 7,418,148 B2 | * | 8/2008 | Hayashi | 382/251 |
| 2003/0105788 A1 | * | 6/2003 | Chatterjee | 708/402 |
| 2003/0191788 A1 | * | 10/2003 | Auyeung et al. | 708/650 |
| 2006/0078213 A1 | * | 4/2006 | Mitchell et al. | 382/248 |
| 2006/0080373 A1 | * | 4/2006 | Hinds et al. | 708/400 |

OTHER PUBLICATIONS

Masayuki Ito, Naofumi Takagi,Shuzo Yajima, "Efficient Initial Approximation for Multiplicativ Deivision and Square Root by a Multiplication with Operand Modification",IEEE Transactions on Computers. vol. 46. No. 4, Apr. 1997, pp. 495-498.*

Robert Alverson, "Integer Division Using Reciprocals" IEEE 1991, pp. 186-190.*

* cited by examiner

*Primary Examiner* — Brian Q Le
*Assistant Examiner* — Mekonen Bekele
(74) *Attorney, Agent, or Firm* — Polsinelli Shughart PC (57) ABSTRACT

A method, system and computer program product that involves receiving and initializing a digital image. Quantization is preformed on the digital image using at least two multiplication operations. Finally, a compressed version of the digital image is presented for viewing and/or storage or transport.

17 Claims, 5 Drawing Sheets

SYSTEM AND METHOD FOR ACCURATE PARALLEL QUANTIZATION WITH TWO MULTIPLICATION OPERATIONS

FIELD OF THE INVENTION

Aspects of the present invention generally involve systems, methods, and computer program products for performing accurate parallel quantization, and more particularly the present invention involves parallel quantization with two multiplication operations.

BACKGROUND

The quantization function is often an important part of digital image processing. Quantization generally involves compression of a digital image and is used to allow for digital images to be stored and transported more efficiently, amongst other things. Presently, quantization functions require computer instructions that perform division operations. For most computer architectures division operations require many more clock cycles to complete than multiplication operations. Attempts have been made to replace the division operation in the quantization function with a single multiplication operation. However, the results are inaccurate for some applications (e.g. blurring or distorting the image). Currently, it is believed that there are no accurate and efficient ways to implement quantization functions without performing a division operation. Accordingly, an efficient and accurate way to perform the quantization operation of the digital image compression process is needed.

SUMMARY

One aspect of the present invention involves a method for image compression. The method includes receiving a digital image, and initializing one or more quantization tables. The method further includes performing quantization of the digital image using two multiplication operations at least in part on the one or more quantization tables, and providing a compressed version of the digital image.

Another aspect of the present invention involves a machine-readable medium. The machine-readable medium is to receive an input image and a quantization table, and compute a first scaled reciprocal number for each data value in the quantization table. Each of the first scaled reciprocal numbers are used to compute a remainder value for each corresponding data value. The machine-readable medium further is to compute a second scaled reciprocal number by using the remainder value, and then compute a compensation value for each data value based at least in part on the corresponding second scaled reciprocal number. Finally, the machine-readable medium generates a quantization value for each data value based at least in part on the corresponding compensation value, and provides a compressed version of the input image based at least in part on the quantization values.

A further aspect of the present invention involves a system for compression of a digital image that includes at least one processor. The system further includes a forward discrete cosine transformer (FDCT) to generate discrete cosine transformation (DCT) coefficients for each value in a quantization table, and a quantizer to perform quantization of the quantization using two multiplication operations.

DETAILED DESCRIPTION OF EMBODIMENTS OF THE INVENTION

Aspects of the present invention involve calculating and rendering a compressed version of a digital image using two multiplication operations during the quantization process. Compressing a digital image using two multiplication operations during quantization is a more efficient use of processor resources than conventional processes that rely on division operations. By using two multiplication operations, the quantization process achieves increases in efficiency without sacrificing accuracy in the resulting compressed digital image. For example, quantization with two multiplication operations avoids unwanted artifacts and blurring in the compressed image.

Digital image compression and the quantization steps may be preformed by a computer system (e.g. computer system 500 discussed below with reference to FIG. 5) or by a variety of other computational devices (e.g. cellular phone devices, digital cameras, digital camcorders, etc.). Further, because compressed images are reduced to a smaller more manageable format than uncompressed images, more efficient storage and transport of the compressed digital images may be achieved.

Figure 1:
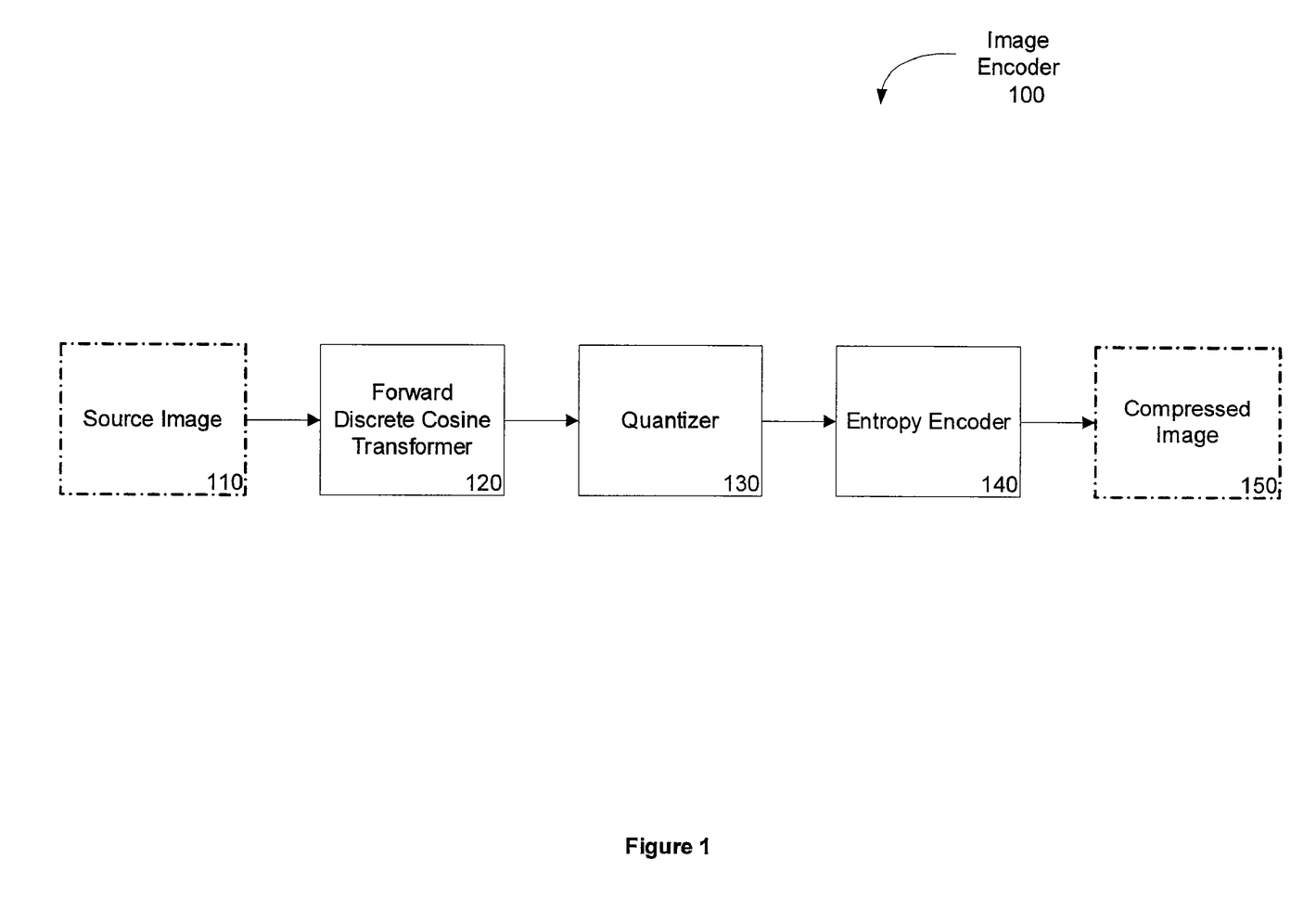
FIG. 1 is a block diagram illustrating system modules for implementing aspects of the present invention.

FIG. 1 illustrates modules that may be used to implement the operational processes of image compression. A source image 110 is inputted into a forward discrete cosine transformer (FDCT) 120. The source image 110 may be any uncompressed (or raw) data of a digital image. In one implementation, the data source image 110 may be "tiled" into individual 8×8 pixel blocks to be processed by the FDCT 120. Each of the 8×8 blocks are then processed by a quantization module using quantization tables that correspond to different compression standards (e.g. JPEG) or other applications.

The FDCT 120 transforms the source image 110 for quantization by processing each 8×8 block into a set of 64 values referred to as discrete cosine transformation (DCT) coefficients. The initialization process may be in accordance with operations 310 through 340 of FIG. 3.

Figure 4:
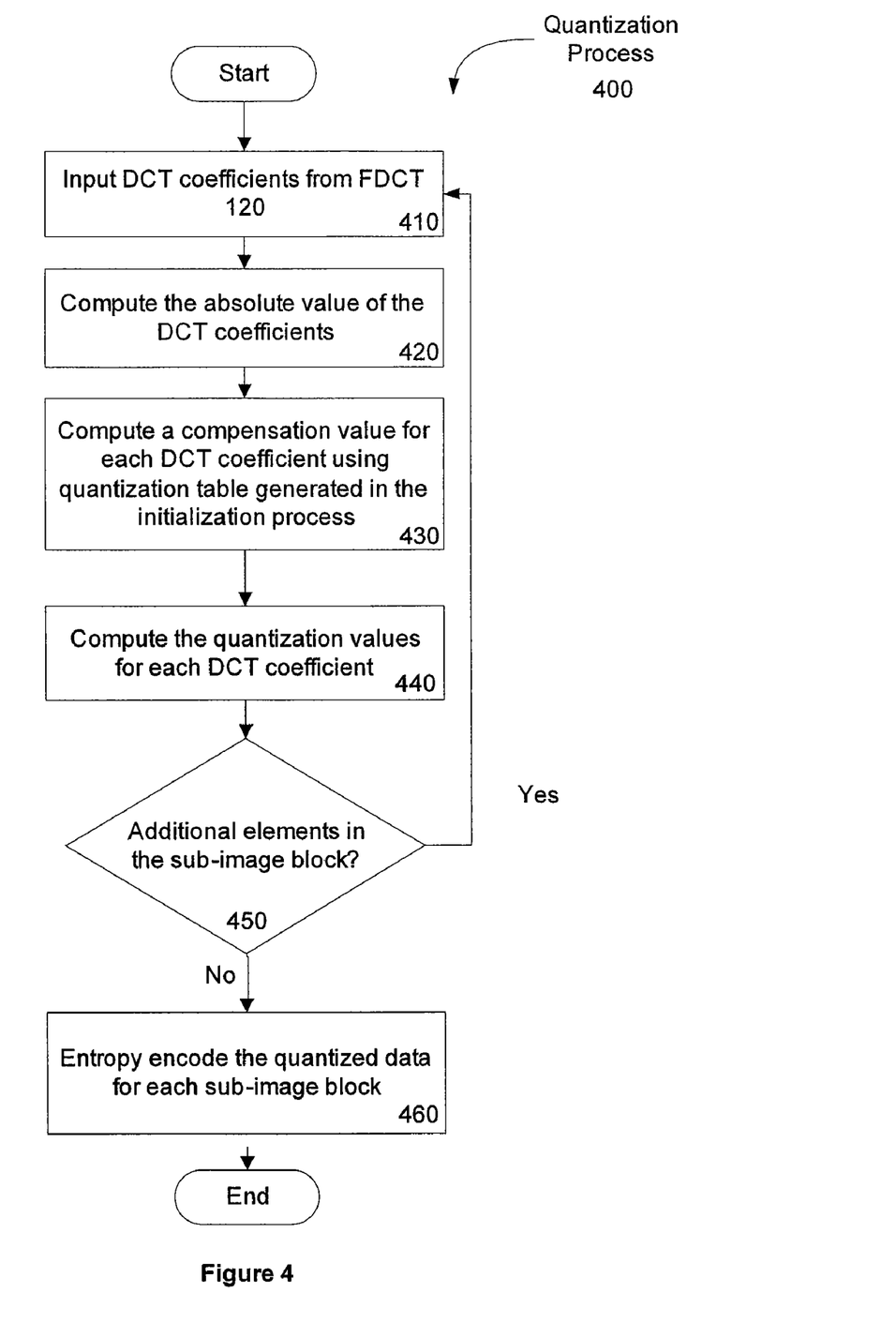
FIG. 4 is a flowchart illustrating a quantization process used for performing digital image compression according to one embodiment of the present invention.

Each of the DCT coefficients for each of the 8×8 blocks generated by the FDCT 120 are quantized by a quantizer 130 using one of the 64 values from a quantizationtable. The quantizer 130 performs this quantization process using two multiplication operations and no division operations. In one embodiment, operations 410 through 440 of FIG. 4 are executed by quantizer 130 to perform the quantization processing of the digital image. However, other operations may be preformed in accordance with aspects of the present invention.

An entropy encoder 140 receives the quantized DCT coefficients from the quantizer 130. The entropy encoder 140 further encodes the quantized DCT coefficients. The processes preformed by the entropy encoder 140 may involve arranging the quantized DCT coefficients in a "zigzag" order by employing run-length encoding (RLE). RLE effectively groups similar frequencies in the image together by inserting length coding zeros, and then using Huffman coding on the remainder of the image. A compressed image 150 is the result of image encoder 100. The compressed image 150 may be in a variety of formats such as, but not limited to JPEG, BMP and GIF.

Figure 2:
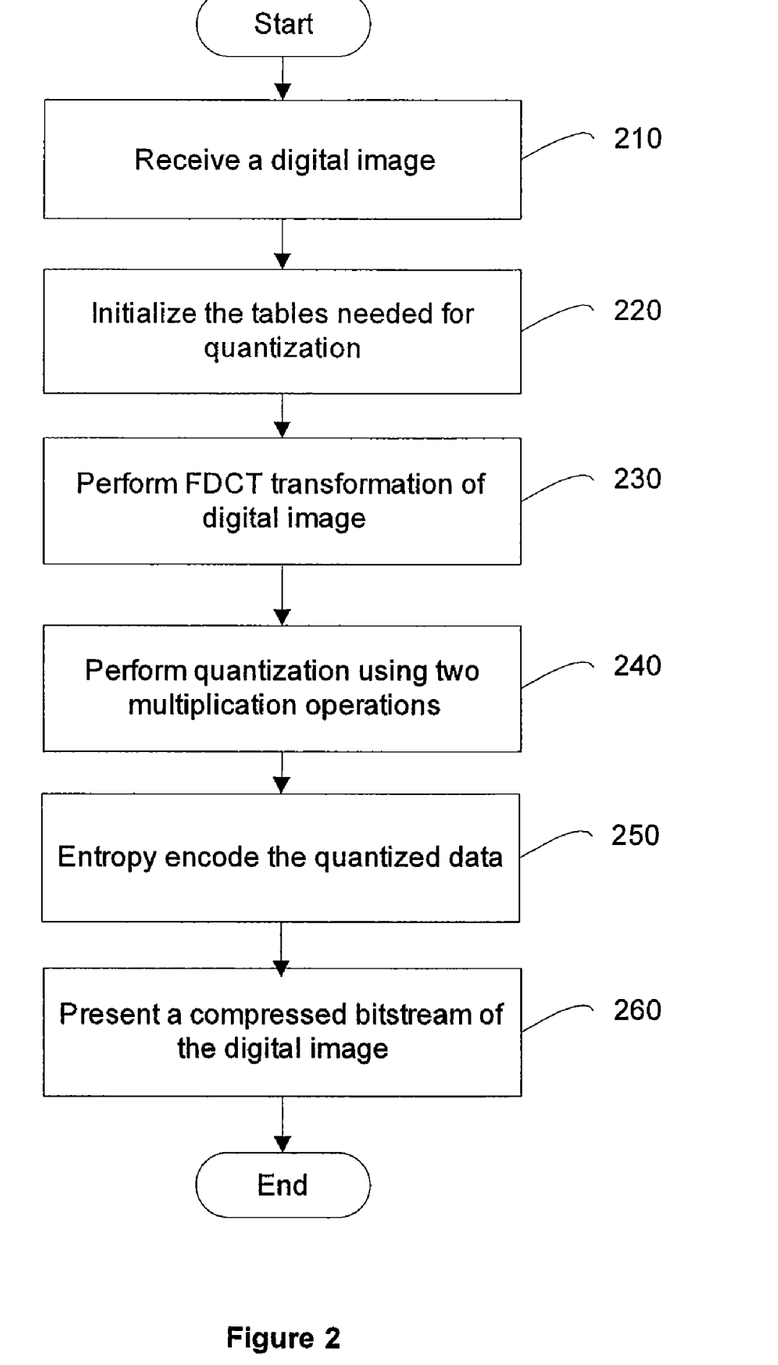
FIG. 2 is a flowchart illustrating a process for performing digital image compression according to one embodiment of the present invention.
Figure 3:
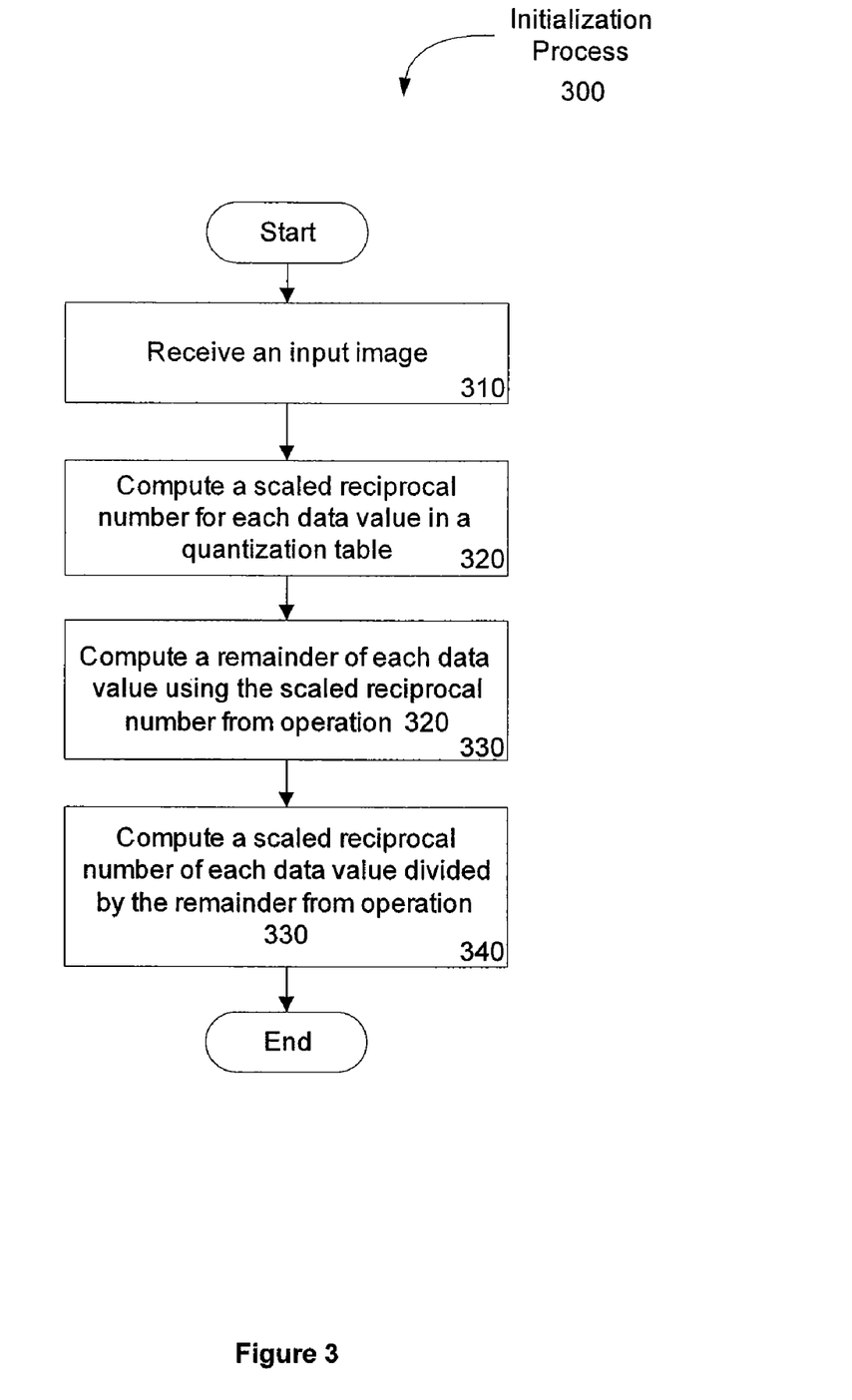
FIG. 3 is a flowchart illustrating an initialization process used for performing digital image compression according to one embodiment of the present invention.

FIGS. 2, 3, and 4 illustrate processes for accurately and efficiently compressing a digital image using two multiplication operations during the quantization process.

Referring now to FIG. 2, a digital image to be compressed is received (operation 210). The digital image may be received from a memory storage device (e.g. flash memory, hard drive, etc.). The digital image may be in a raw or uncompressed format, or the image may be in a compressed format (e.g. BMP, JPEG, GIF, etc.). Prior to performing the quantization process two tables (or matrices) needed for quantization are generated during an initialization process (operation 220). This initialization process according to one particular implementation is discussed below with regard to operations 310-340 of FIG. 3.

After the two quantization tables have been initialized, the FDCT 120 transforms the digital image by generating DCT coefficients (operation 230). Then the quantization process is preformed on the DCT coefficients using two multiplication operations as opposed to one division operation (operation 240). In many processing environments division operations require significantly more clock cycles to execute, which causes the processor to stall or creates cache misses resulting in a slowdown in processing time. In contrast, multiplication operations are faster than division operations because multiplication requires fewer clock cycles. Furthermore, replacing the division operation with two multiplication operations as opposed to one multiplication operation produces accurate results.

Further, entropy encoding of the quantized DCT coefficients is preformed (operation 250). Finally, a compressed version of the image is presented (operation 260). The compressed image may then be viewed by an image viewer. The compressed image may be transmitted to another location (e.g. via electronic mail (e-mail), local area network (LAN), etc.). The compressed image uses less storage space than the uncompressed image, thus making storage and transmission faster and more efficient. Compressed images are often used for viewing over the Internet and other networks because they can be transmitted at greater speeds, and consequently consume less bandwidth than uncompressed images.

Figure 5:
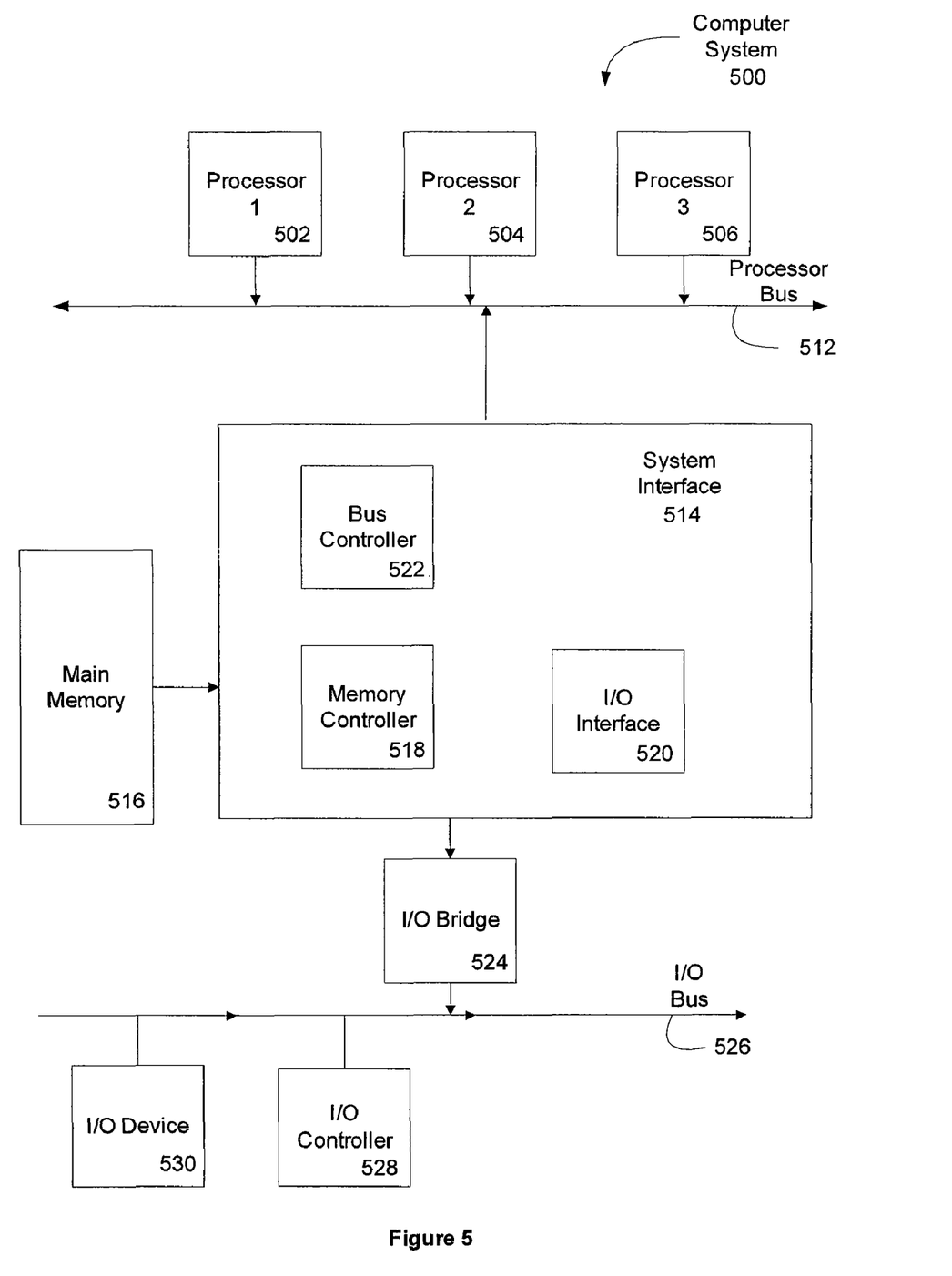
FIG. 5 is a block diagram illustrating a computer system.

Turning now to FIG. 3 which is a flowchart illustrating operations of one embodiment of performing image compression according to aspects of the present invention. The process operations may be in the form of computer instructions running on a computer system (e.g. computer system 500) or specific components of the computer system (e.g. a graphics card). Process 300 receives an input image (operation 310). The image may be provided with various pixel heights and pixel widths (e.g. 800×600, 1024×768, 1600×1200, etc.). The image may be "tiled" or subdivided into smaller 8×8 blocks (or sub-images) representing sections of the digital image. The number of 8×8 blocks is determined by the pixel height and width of the digital image.

Subsequently, a scaled reciprocal number is computed for each data value in a quantization table (operation 320). The quantization table corresponds to the compression format (e.g. JPEG) being used to compress the digital image. The scaled reciprocal numbers may be computed as follows:
$Qr[i]=((1<<n)+(Q[i]>>1))/Q[i]$; where $Qr[i]$ is the reciprocal number, $Q[i]$ is a data value from the quantization table (or matrix), and n is a value used to scale the reciprocal of $Q[i]$.

In one embodiment, n may be equal to 15; however, other values for n may be used.

Furthermore, other computations may be used to compute the scaled reciprocal numbers.

The operations ">>" and "<<" generally refer to shift operations. Typically, a shift operation is an operation that moves bit values of a binary object, such as the bit values of an image. The "<<" operator refers to a left shift operation and indicates that bits are to be shifted to the left. The ">>" operator refers to a right shift operation and indicates that bits are to be shifted to the right.

Process 300 then computes a remainder value for each data value in the quantization table (operation 330). The remainder values may be computed by using the scaled reciprocal numbers computed in operation 320. The remainder values may be computed as follows:
$R[i]=(1<<n)-Q[i]*Qr[i]$; where $R[i]$ is the remainder value, and n is a value used to scale the reciprocal of $Qr[i]$.

However, as with other operations discussed herein, other computations may be used to compute the remainder values, depending on a particular implementation.

Using the remainder values computed in operation 330, another set of scaled reciprocal numbers may be computed for each element corresponding to the table generated by operation 320 (operation 340). The second set of scaled reciprocal numbers is computed using the remainder values from operation 330. The second set of scaled reciprocal numbers may be computed as follows:
$Dr[i]=((1<<NBITS)*R[i]+(Q[i]>>1))/Qr[i]$; where $Dr[i]$ is the second scaled reciproca number and NBITS is a n-bits-width quantization table.

In one embodiment, NBITS the number of bits needed to store the elements of the quantization table. In one embodiment, N is equal to 16; however, other values for N may be used. Further, other computations may be used to compute the second set of scaled reciprocal numbers.

Operations 310 through 340 reflect a particular way to achieve the initialization process set out in the method of FIG. 2.

Turning now to FIG. 4 which illustrates a quantization process 400. Process 400 receives the DCT coefficients from the FDCT 120 (operation 410). Process 400 then computes the absolute value of each of the DCT coefficients (operation 420). The absolute value of each DCT cofficent may be computed as follows:
$SignX[i]=(X[i]>>(NBITS-1))$ and $X'[i]=(SignX[i]^\wedge X[i])-SignX[i]$; where $X[i]$ is a DCT coefficient.

Further, process 400 uses the scaled reciprocal numbers generated during the initialization process in FIG. 3 to compute a compensation value for each of the DCT coefficients (operation 430). The compensation value is used to compensate or adjust the digital image during the quantization process in order to maintain image precision. The compensation values may be computed as follows:
Using the absolute value of each DCT coefficient the compensation value (i.e. $Cr[i]$) can be computed as follows:
$Cr[i]=(Dr[i]*X'[i]+(1<<(NBITS-1)))>>NBITS$.

However, other computations may be used to compute the compensation values.

Further, process 400 uses the compensation values generated by operation 430 to generate quantization values for each of the DCT coefficients (operation 440). Generating the quantization values may be preformed as follows:
$Y[i]=(SignX[i]^\wedge (Qr[i]*X'[i]+(1<<(n-1))+Cr[i]>>n)-SignX[i]$; where value for the corresponding data value from the quantization table.

However, other computations may be used to compute the quantization values. Operations 410-440 may be repeated until all of the DCT coefficients in the sub-image block have been computed (decision operation 450). Operations 430 and 440 are the quantization operations which use two multiplication operations as opposed to one division operation.

The entropy encoder 140 then uses the quantized DCT coefficients generated by operation 440 to generate a compressed version of the input image (operation 460).

Referring now to FIG. 5 which is a block diagram illustrating an exemplary computer system 500 to be used in implementing embodiments of the present invention. Specifically, computer system 500 may be used to execute operations of aspects of the present invention. Alternatively, computer system 500 may used to implement system modules in accordance with aspects of the present invention.

The computer system (system) includes one or more processors 502-506. The processors 502-506 may include one or more single-threaded or multi-threaded processors. A typical multi-threaded processor may include multiple threads or logical processors, and may be capable of processing multiple instruction sequences concurrently using its multiple threads. Processors 502-506 may also include one or more internal levels of cache (not shown) and a bus controller or bus interface unit to direct interaction with the processor bus 512.

Processors 502-506 may be a variety of processor implementations (e.g. a SPARC™ processor or an x86™ processor). The processors may implement a variety of instructions sets (e.g. single instructions multiple data (SIMD), streamed SIMD extension (SSE2) or visual instruction set (VIS)). However, other processor types and instruction sets may be implemented.

Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 518 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. For example, as illustrated, the I/O interface 520 may interface an I/O bridge 524 with the processor bus 512. I/O bridge 524 may operate as a bus bridge to interface between the system interface 514 and an I/O bus 526. One or more I/O controllers and/or I/O devices may be connected with the I/O bus 526, such as I/O controller 528 and I/O device 530, as illustrated. I/O bus 526 may include a peripheral component interconnect (PCI) bus or other type of I/O bus.

System 500 may include a dynamic storage device, referred to as main memory 516, or a random access memory (RAM) or other devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506.

Main memory 516 or dynamic storage device may include a magnetic disk or an optical disc for storing information and instructions. I/O device 530 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 530 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 500 may be coupled with a number of clients and/or servers via a conventional network infrastructure, such as a company's Intranet and/or the Internet, for example.

It is appreciated that a lesser or more equipped system than the example described above may be desirable for certain implementations. Therefore, the configuration of system 500 may vary from implementation to implementation depending upon numerous factors, such as price constraints, performance requirements, technological improvements, and/or other circumstances.

It should be noted that, while the embodiments described herein may be performed under the control of a programmed processor, such as processors 502-506, in alternative embodiments, the embodiments may be fully or partially implemented by any programmable or hard coded logic, such as field programmable gate arrays (FPGAs), transistor logic (TTL), or application specific integrated circuits (ASICs). Additionally, the embodiments of the present invention may be performed by any combination of programmed general purpose computer components and/or custom hardware components. Therefore, nothing disclosed herein should be construed as limiting the various embodiments of the present invention to a particular embodiment wherein the recited embodiments may be performed by a specific combination of hardware components.

While the disclosed embodiments are described in specific terms, other embodiments encompassing principles of the invention are also possible. Further, operations may be set forth in a particular order. The order, however, is but one example of the way that operations may be provided. Operations may be rearranged, modified, or eliminated in any particular implementation while still conforming to aspects of the invention. Embodiments within the scope of the present invention also include computer readable media for carrying or having computer executable instructions or data structures stored thereon. Such computer readable media may be any available media that can be accessed by a general purpose or special purpose computer (e.g. computer system 500). By way of example, and not limitation, such computer readable media can comprise RAM, ROM, PROM, EPROM, EEPROM, DVD, CD ROM or other optical disk storage, magnetic disk storage or other magnetic storage devices, or any other medium which can be used to carry or store desired program code means in the form of computer executable instructions or data structures and which can be accessed by a general purpose or special purpose computer. When information is transferred or provided over a network or another communications link or connection (either hardwired, wireless, or a combination of hardwired or wireless) to a computer, the computer properly views the connection as a computer readable medium. Thus, any such a connection is properly termed a computer readable medium. Combinations of the above should also be included within the scope of computer readable media. Computer executable instructions comprise, for example, instructions and data which cause a general purpose computer, special purpose computer, or special purpose processing device to perform a certain function or group of functions.

We claim:

1. A method for image compression, the method comprising:
   receiving a digital image;
   initializing a plurality of quantization tables;
   performing quantization of the digital image using two multiplication operations using values from the one or more quantization tables;
   computing a compensation value for each data value in a sub-image block of the digital image based at least in part on a corresponding scaled reciprocal number, wherein the operation of computing the compensation value using one of the multiplication operations is at least in part preformed by the following computations:
   $Cr[i]=(Dr[i]*X'[i]+(1<<(NBITS-1)))>>NBITS$,
   wherein $Cr[i]$ is the compensation values, $Dr[i]$ is the scaled reciprocal number, $X'[i]$ is the absolute value of each DCT coefficient, and NBITS is a nbits-width quantization table;
   generating a quantization value for each data value based at least in part on the corresponding compensation value, wherein the operation of generating the quantization value using one of the multiplication operations is at least in part preformed by the following computations:
   $Y[i]=(SignX[i]\hat{\ }(Qr[i]*X'[i]+(1>>(n-1))+Cr[i]>>n)-SignX[i]$, wherein $Y[i]$ is the quantization value and $Qr[i]$ is the plurality of quantization tables; and
   providing a compressed version of the digital image.

2. The method of claim 1, wherein the digital image is received from one or more of a flash memory, a hard drive, and a digital camera.

3. The method of claim 1, wherein the initializing of the one or more quantization tables further comprises transforming data entries in the one or more quantization tables.

4. The method of claim 1, wherein the digital image is subdivided into a plurality of image blocks.

5. The method of claim 4, wherein the blocks include a pixel height and a pixel width.

6. The method of claim 1, wherein the compressed version of the digital image is one or more of:
   a Joint Photographic Experts Group (JPEG) quantization, Graphics Interchange Format (GIF) quantization, and a BitMap (BMP) compression.

7. A non-transitory machine-readable medium including sets of instructions which, when executed by a machine, cause the machine to:
   receive an input image and a plurality of quantization tables;
   compute a first scaled reciprocal number for each data value in the quantization table, wherein each of the first scaled reciprocal numbers are used to compute a remainder value for each corresponding data value;
   compute a second scaled reciprocal number by using the remainder value;
   compute a compensation value for each data value based at least in part on the corresponding second scaled reciprocal number, wherein to compute the compensation value using one of the multiplication operations is at least in part preformed by the following computations:
   $Cr[i]=(Dr[i]*X'[i]+(1<<(NBITS-1)))>>NBITS$,
   wherein $Cr[i]$ is the compensation values, $Dr[i]$ is the scaled reciprocal number, $X'[i]$ is the absolute value of each DCT coefficient, and NBITS is a nbits-width quantization table;
   generate a quantization value for each data value based at least in part on the corresponding compensation value, wherein to generate the quantization value using one of the multiplication operations is at least in part preformed by the following computations:
   $Y[i]=(SignX[i]\hat{\ }(Qr[i]*X'[i]+(1<<(n-1))+Cr[i]>>n)-SignX[i]$, wherein $Y[i]$ is the quantization value and $Qr[i]$ is the plurality of quantization tables; and
   provide a compressed version of the input image based at least in part on the quantization values.

8. The machine-readable medium of claim 7, wherein the sets of instructions which, when further executed by the machine, cause the machine to check the quantization table for additional data values.

9. The machine-readable medium of claim 7, wherein the sets of instructions which, when further executed by the machine, cause the machine to generate an scaled reciprocal numbers table including each of the second scaled reciprocal number.

10. The machine-readable medium of claim 7, wherein the sets of instructions which, when further executed by the machine, cause the machine to check the scaled reciprocal numbers table for additional entries.

11. The machine-readable medium of claim 7, wherein the input image is subdivided into a plurality of image blocks.

12. The machine-readable medium of claim 11, wherein a pixel height and pixel width determine how many image blocks the input image is subdivided into.

13. The machine-readable medium of claim 12, wherein the pixel height and pixel width are one or more of: 800×600, 1024×768, and 1600×1200 formats.

14. A system for compression of a digital image including at least one processor, the system comprising:
   a forward discrete cosine transformer (FDCT) to generate, at the processor, discrete cosine transformation (DCT) coefficients for each value in a plurality of quantization tables; and
   a quantizer to, at the processor:
      perform quantization of the digital image using two multiplication operations using values from the plurality of quantization tables;
      compute a compensation value for each data value in a sub-image block of the digital image based at least in part on a corresponding scaled reciprocal number, wherein to compute the compensation value using one of the multiplication operations is at least in part preformed by the following computations:
      $Cr[i]=(Dr[i]*X'[i]+(1<<(NBITS-1)))>>NBITS$,
      wherein $Cr[i]$ is the compensation values, $Dr[i]$ is the scaled reciprocal number, $X'[i]$ is the absolute value of each DCT coefficient, and NBITS is a nbits-width quantization table;
      generating a quantization value for each data value based at least in part on the corresponding compensation value, wherein the operation of generating the quantization value using one of the multiplication operations is at least in part preformed by the following computations:
      $Y[i]=(SignX[i]\hat{\ }(Qr[i]*X'[i]+(1<<(n-1))+Cr[i]>>n)-SignX[i]$, wherein Y[i] is the quantization value and Qr[i] is the plurality of quantization tables; and provide a compressed version of the digital image.

15. The system of claim 14, further comprising an entropy encoder to further compresses the digital image.

16. The system of claim 14, further comprising a compressed format of the digital image.

17. The system of claim 14, wherein the quantizer is further to compute a compensation value for each value in the quantization table based at least in part on a corresponding scaled reciprocal number, and to generate a quantization value for each value in the quantization table based at least in part on the corresponding compensation value.

* * * * *